US011151087B2

(12) United States Patent
Chittaro et al.

(10) Patent No.: US 11,151,087 B2
(45) Date of Patent: Oct. 19, 2021

(54) TRACKING FILE MOVEMENT IN A NETWORK ENVIRONMENT

(71) Applicant: Interset Software, Inc., Santa Clara, CA (US)

(72) Inventors: Ron Chittaro, Ottawa (CA); Eric Rosenquist, Ottawa (CA); Kevin Goodman, Ottawa (CA); Mario Daigle, Ottawa (CA)

(73) Assignee: Interset Software Inc., Santa Clara, CA (US)

( * ) Notice: Subject to any disclaimer, the term of this patent is extended or adjusted under 35 U.S.C. 154(b) by 240 days.

(21) Appl. No.: 16/217,639

(22) Filed: Dec. 12, 2018

(65) Prior Publication Data

US 2019/0179804 A1   Jun. 13, 2019

Related U.S. Application Data

(60) Provisional application No. 62/597,786, filed on Dec. 12, 2017, provisional application No. 62/597,624, filed on Dec. 12, 2017.

(51) Int. Cl.
G06F 16/17 (2019.01)
G06F 16/14 (2019.01)
G06F 16/18 (2019.01)
G06F 16/182 (2019.01)
G06F 16/16 (2019.01)
G06F 21/00 (2013.01)

(52) U.S. Cl.
CPC ........ *G06F 16/1734* (2019.01); *G06F 16/152* (2019.01); *G06F 16/164* (2019.01); *G06F 16/1827* (2019.01); *G06F 16/1873* (2019.01); *G06F 21/00* (2013.01)

(58) Field of Classification Search
USPC ........................................................ 707/758
See application file for complete search history.

(56) References Cited

U.S. PATENT DOCUMENTS

| 6,389,403 | B1* | 5/2002 | Dorak, Jr. | G06F 21/10 705/51 |
| 6,505,160 | B1* | 1/2003 | Levy | G06K 9/00442 704/270 |
| 6,952,737 | B1* | 10/2005 | Coates | G06F 3/0607 709/229 |
| 7,266,555 | B1* | 9/2007 | Coates | G06F 16/172 707/827 |
| 7,415,731 | B2* | 8/2008 | Carpentier | H04L 63/12 726/30 |
| 7,428,540 | B1* | 9/2008 | Coates | H04L 67/1097 |
| 8,667,273 | B1 | 3/2014 | Billstrom | |
| 8,769,296 | B2* | 7/2014 | Etchegoyen | G06F 21/121 713/187 |
| 8,832,466 | B1 | 9/2014 | McGregor, Jr. | |
| 9,152,706 | B1 | 10/2015 | Claudatos | |
| 9,792,316 | B1* | 10/2017 | Cremelie | G06F 11/1453 |
| 10,102,352 | B2* | 10/2018 | Butcher | G06F 21/10 |

(Continued)

*Primary Examiner* — Cam Linh T Nguyen

(57) ABSTRACT

File access in a network environment by detecting when files have been accessed at a computers in the network environment, and then generating unique content identifiers of the file content. The content identifier along with access metadata can be transmitted to and stored at a central location. The stored information can be used to track file content movement in the network environment.

19 Claims, 7 Drawing Sheets

(56) References Cited

U.S. PATENT DOCUMENTS

| | | | |
|---|---|---|---|
| 2002/0126872 A1* | 9/2002 | Brunk | H04N 19/467 382/100 |
| 2004/0019658 A1* | 1/2004 | Plastina | G06F 16/40 709/217 |
| 2004/0073617 A1 | 4/2004 | Milliken | |
| 2006/0062426 A1* | 3/2006 | Levy | G11B 20/00086 382/100 |
| 2007/0156726 A1* | 7/2007 | Levy | G06F 21/10 |
| 2007/0162596 A1* | 7/2007 | Sekiguchi | H04L 43/0811 709/224 |
| 2007/0174059 A1* | 7/2007 | Rhoads | G10L 25/48 704/273 |
| 2007/0244877 A1* | 10/2007 | Kempka | G06F 16/10 |
| 2007/0245119 A1 | 10/2007 | Hoppe | |
| 2009/0158318 A1* | 6/2009 | Levy | G06F 21/36 725/32 |
| 2009/0171990 A1* | 7/2009 | Naef, III | G06Q 10/06 |
| 2012/0089648 A1* | 4/2012 | Kozan | G11B 20/00086 707/802 |
| 2013/0067238 A1 | 3/2013 | Homme | |
| 2013/0097696 A1* | 4/2013 | Baker | H04L 63/1441 726/17 |
| 2013/0276114 A1* | 10/2013 | Friedrichs | G06F 21/567 726/23 |
| 2014/0250066 A1 | 9/2014 | Calkowski | |
| 2014/0250142 A1 | 9/2014 | Pradhan | |
| 2014/0317666 A1* | 10/2014 | Chiarulli | H04H 60/06 725/114 |
| 2014/0337950 A1 | 11/2014 | Yang | |
| 2014/0358938 A1 | 12/2014 | Billmaier | |
| 2015/0350222 A1* | 12/2015 | Hashimoto | H04L 63/102 726/3 |
| 2016/0360012 A1* | 12/2016 | Zholudev | H04L 67/20 |
| 2017/0154042 A1 | 6/2017 | Meyer | |
| 2018/0336263 A1 | 11/2018 | Bensberg | |

\* cited by examiner

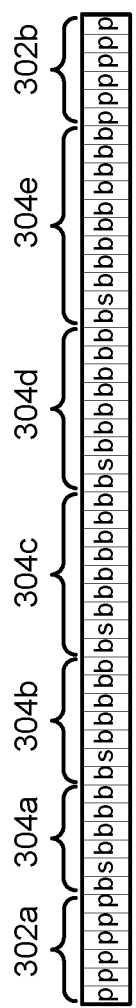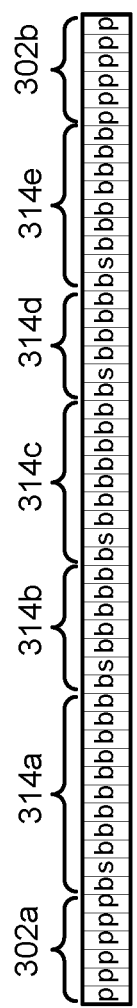

702a

| File Fingerprint | |
|---|---|
| Fingerprint Version | V1.235.0021 |
| Timestamp | 1509646233 |
| File ID | 58af9E |
| First Pass Hash | 7VQmaF<GO2F)rl;@<6) |
| Second Pass Hash | ;e9HWDIal/@<6K4BOPsq |
| Block #1 Hash | 6>URMCEOiV+@op^BE |
| Block #2 Hash | e9HWDIal!Ci<g!+@op^BF |
| Block #3 Hash | (L_DA0>i0Bl8$0Bm9sl |
| Block #4 Hash | AoDg4FD)e+Ci<g!Bl7Pj |

704a: Fingerprint Version, Timestamp, File ID
706a: First Pass Hash
708a: Second Pass Hash
710a: Block #1 Hash
712a: Block #2 Hash
714a: Block #3 Hash
716a: Block #4 Hash

| File Fingerprint | |
|---|---|
| Fingerprint Version | V1.235.0021 |
| Timestamp | 1509646631 |
| File ID | 58af9E |
| First Pass Hash | 7VQmaF<GO2F)rl;@<6) |
| Second Pass Hash | ;e9HWDIal/@<6K4BOPsq |
| Block #1 Hash | 6>URMCEOiV+@op^BE |
| Block #2 Hash | |
| Block #3 Hash | |
| Block #4 Hash | |

704b: Fingerprint Version, Timestamp, File ID
706a: First Pass Hash
708b: Second Pass Hash
710b: Block #1 Hash
712b: Block #2 Hash
714b: Block #3 Hash
716b: Block #4 Hash

FIG. 7B

TRACKING FILE MOVEMENT IN A NETWORK ENVIRONMENT

CROSS-REFERENCE TO RELATED APPLICATIONS

The present application claims priority from U.S. Provisional Patent Applications Nos. 62/597,786 and 62/597,624 each filed Dec. 12, 2017, the entirety of which are hereby incorporated by reference for all purposes

TECHNICAL FIELD

The current application relates to file access monitoring and in particular to tracking movement of files in a network environment.

BACKGROUND

Enterprises may contain sensitive information in the form of files on disk. These files can be moved, copied, emailed, archived, printed etc. The information contained in these files may be targets of theft either by an intruder or by an insider who may have been granted access to valuable information. Data theft often leaves no artifacts such that detection can be automated thus leaving the investigation to a highly manual process that can take an unacceptable amount of time. The ability to automatically track file movement would be beneficial to an enterprise that wants awareness of how their valuable data is being accessed an enable systems to automate this process.

BRIEF DESCRIPTION OF THE DRAWINGS

Further features and advantages of the present disclosure will become apparent from the following detailed description, taken in combination with the appended drawings, in which:

FIGS. 3A and 3B provide an illustrative file read profiles;

FIGS. 7A and 7B depict illustrative fingerprints of a file.

DETAILED DESCRIPTION

Figure 1:
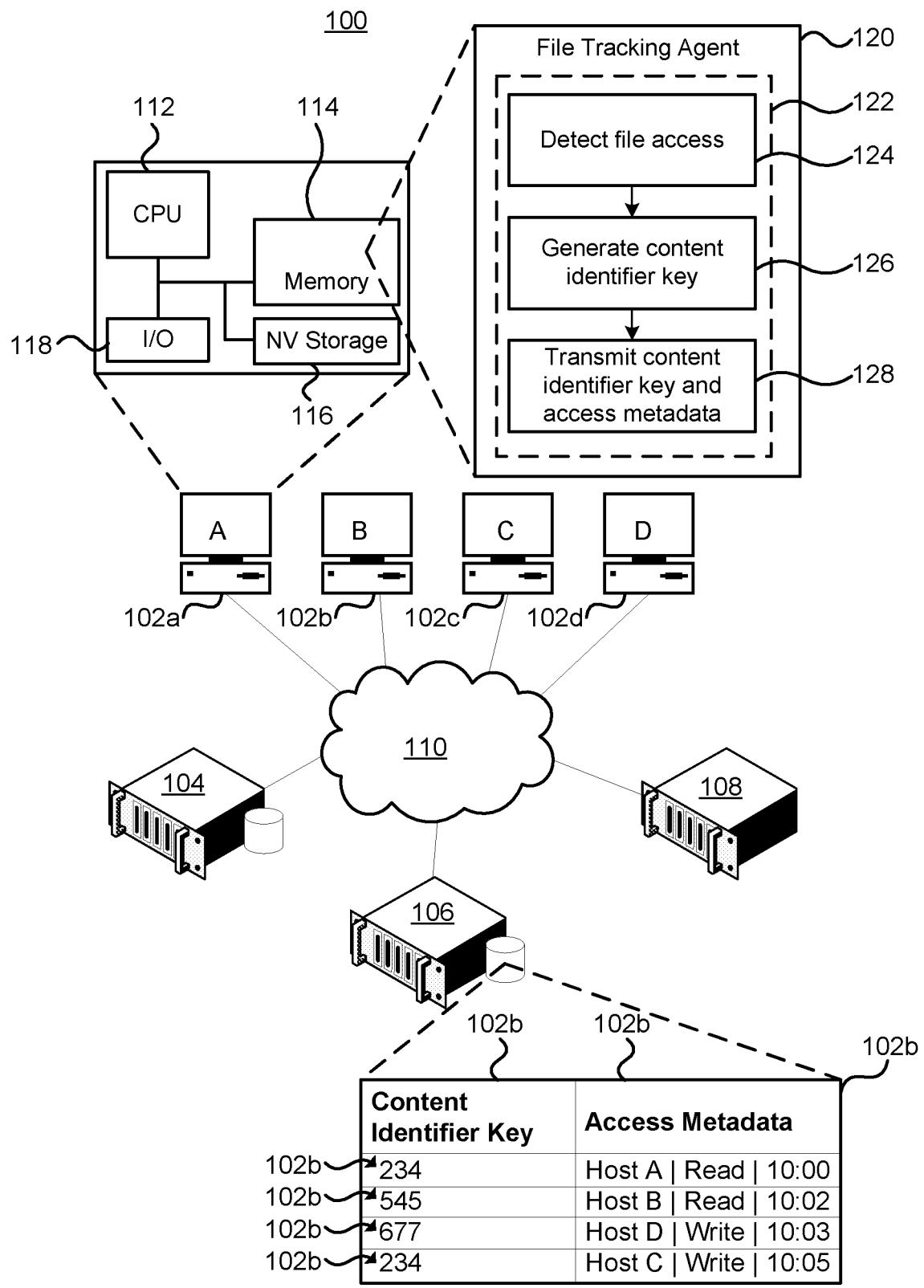
FIG. 1 depicts a system and method for tracking file access in a network environment.

In accordance with the present disclosure there is provided a method for use in tracking file movement in a network environment, the method comprising: at a host computing device on the network, detecting that a file has been accessed; at the host computing device, cause a unique content identifier for the file to be generated from at least a portion of the file; and transmitting to centralized storage the generated content identifier and access metadata of accessing the file.

In a further embodiment of the method, the unique content identifier comprises a hash of the entire file.

In a further embodiment of the method, the unique content identifier comprises a file fingerprint including one or more hashes generated according to a read profile for the file, the read profile comprising a nominal number of hash passes for fingerprinting the entire file.

In a further embodiment of the method, causing the unique content identifier to be generated comprises adding the file to a list of files to be fingerprinted.

In a further embodiment of the method, the access metadata comprises information that may be useful in a forensic analysis of file access for the file.

In a further embodiment of the method, the access metadata comprises one or more of: a time the file was accessed; a user that accessed the file; a location the file was accessed from; an application used in accessing the file; and a computer host used to access the file.

In a further embodiment, the method further comprises receiving at the centralized storage the transmitted content identifier and access metadata of accessing the file; and storing at the centralized storage the received content identifier in association with the received access metadata.

In a further embodiment of the method, the centralized storage receives and stores a plurality of content identifiers and associated access metadata.

In accordance with the present disclosure there is further provided a device for use in tracking file movement in a network environment, the device comprising: a processor capable of executing instructions; and a memory storing instructions, which when executed by the processor configure the device to detect that a file has been accessed; cause a unique content identifier for the file to be generated from at least a portion of the file; and transmit to centralized storage the generated content identifier and access metadata of accessing the file.

In a further embodiment of the device, the unique content identifier comprises a hash of the entire file.

In a further embodiment of the device, the unique content identifier comprises a file fingerprint including one or more hashes generated according to a read profile for the file, the read profile comprising a nominal number of hash passes for fingerprinting the entire file.

In a further embodiment of the device, causing the unique content identifier to be generated comprises adding the file to a list of files to be fingerprinted.

In a further embodiment of the device, the access metadata comprises information that may be useful in a forensic analysis of file access for the file.

In a further embodiment of the device, the access metadata comprises one or more of: a time the file was accessed; a user that accessed the file; a location the file was accessed from; an application used in accessing the file; and a computer host used to access the file.

In accordance with the present disclosure there is further provided a system for tracking file movement in a network environment, the system comprising: a plurality of devices, each device comprising: a processor capable of executing instructions; and a memory storing instructions, which when executed by the processor configure the device to: detect that a file has been accessed; cause a unique content identifier for the file to be generated from at least a portion of the file; and transmit to centralized storage the generated content identifier and access metadata of accessing the file; the centralized storage comprising: a processor capable of executing instructions; and a memory storing instructions, which when executed by the processor configure the centralized storage to: receive the transmitted content identifier and access metadata of accessing the file; and store the received content identifier in association with the received access metadata.

In a further embodiment of the system, the centralized storage receives and stores a plurality of content identifiers and associated access metadata.

In a further embodiment of the system, the unique content identifier comprises a hash of the entire file.

In a further embodiment of the system, the unique content identifier comprises a file fingerprint including one or more hashes generated according to a read profile for the file, the read profile comprising a nominal number of hash passes for fingerprinting the entire file.

In a further embodiment of the system, causing the unique content identifier to be generated comprises adding the file to a list of files to be fingerprinted.

In a further embodiment of the system, the access metadata comprises information that may be useful in a forensic analysis of file access for the file.

In a further embodiment of the system, the access metadata comprises one or more of: a time the file was accessed; a user that accessed the file; a location the file was accessed from; an application used in accessing the file; and a computer host used to access the file.

Sensitive information contained in network accessible files may be vulnerable to theft by copying of the files by a user account that is authorized to access the files. While file access controls, such as allowing only certain accounts to read, write and/or view certain files can help control access to files, it does not prevent an authorized account from being used in copying and stealing the files, for example if the account is compromised or the user of the account is a compromised insider. As described further herein file movement can be automatically tracked, which can be used to identify when a file is copied and so take action to mitigate damage if the copied file is a sensitive file. Although the file tracking may not prevent the copying of sensitive files, it can be used to provide an alert or take other mitigating actions that can mitigate the potential damage of the possible file theft.

Identifying file movement involves first detecting that a file may have changed locations, creating and attaching a value that uniquely identifies the contents of the file and storing this value along with access metadata are stored together in a central location. The access metadata may identify, for example the time the file was accessed, the user that accessed the file, the location the file was accessed from, the application used in accessing the file a computer host used to access the file as well as other access data that may be used for the forensic analysis of file access. File access includes when a file is read from or written to including reading, saving, copying and moving files. Each computer device generates a file content identifier and access metadata when it accesses a file and as such the file content identifier stored in the central location can be used to track the file movement across the network.

The consolidated central storage can be used to apply various methods to track how a file has moved and/or been accessed. For example, a machine learning application could use the file access, movement, user and application information (artifacts) to establish typical usage patterns for the purpose of identifying outliers that indicate data theft.

To track the file movement, each computer includes file tracking functionality that can detect that a file has been accessed, copied or moved, and generate a unique identifier based on the contents of the file after the file has been accessed. It is desirable to generate the unique identifier as soon as possible after the file has been accessed so that the identifier captures the file contents before they may be further modified. Additional meta-data may be attached to, or associated with, the content identifier for the access event. The metadata can provide additional useful context information such as the computer host, path, user and process that accessed the file. This combination of data may be referred to as an artifact or event. The access metadata and content identifier can then be stored to a centralized storage location. A centralized storage database such as Elastic Search could be provided on a common network connected server that each host could securely store the file access information to.

With all endpoint hosts instrumented with the file tracking functionality, all file accesses can be identified across an enterprise. This file access data can be used to build applications such as a machine learning application mentioned above or used to apply automatic forensics techniques.

FIG. 1 depicts a system and method for tracking file access in a network environment. The system 100 includes a number of host computer devices, 102a, 102b, 102c, 102d (referred to collectively as host computers 102), that are communicatively coupled to one or more servers 104, 106, 108 by a communication network 110. The servers 104, 106, 108 may provide various functionality such as web services, network management services, file storage and access services, etc. At least one of the servers, depicted as server 106, provides centralized storage of the file access details from the host computers 102.

Each of the host computers 102 comprise a processor 112, memory 114, non-volatile (NV) storage 116 and one or more input/output (I/O) interfaces 118 as depicted for host computer 102. The NV storage 116 may provide for long term storage of data, even in the absence of power. The NV storage 116 may be provided by a hard disk drive, a solid state drive or flash memory. The I/O interfaces 118 may allow additional components to be operatively coupled to the host computers 102, which may include network interface cards, input control devices such as keyboard and mice as well as output devices such as monitors.

The processor 112 may execute instructions stored in memory 114 in order to configure the host computer 102 to provide file tracking functionality 120. The file tracking functionality 120 is implemented on each of the host computers 102. The file tracking functionality 120 may implement a file tracking method 122 that comprises detecting file access (124). When the file access is completed, a content identifier (126) is generated and then the content identifier and access metadata of accessing the file can be transmitted to a central storage location, such as server 106 in FIG. 1. The content identifier may be generated in numerous ways including, for example generating a cryptographic hash of the file contents. The cryptographic hash generates a short string that is statistically unique to the file and as such can be used as a unique identifier of the file content. While the content identifier may be generated as a single hash of the contents, calculating a single hash can be computationally expensive and may result in degradation of performance. Since calculating a hash is an atomic operation, that is it is either completed successfully or not at all, it is not possible to interrupt the hash process and still have a, at least partially, useable hash, and as such the performance degradation during the hashing process may be unavoidable when using a single hash.

While a single hash may be used for fingerprinting a file after accessing it, other techniques for fingerprinting a file may be used for the content identifier that are interruptible. For example U.S. Provisional Application 62/597,624 filed on Dec. 12, 2017, the entire contents of which are included herein by reference, describes an interruptible file fingerprinting processes that uses multiple hashes to provide the fingerprint.

As described in further detail below, the file fingerprint generated by an interruptible fingerprinting process may comprise a plurality of hashes from different portions of the file. Generating a file's fingerprint after a file has been accessed can be difficult if the file being fingerprinted is large and/or accessed via a slow I/O connection, such as a slow network connection. If the fingerprint requires hashes of the entire file, the entire contents of the file would need to be retrieved in order to hash the file, which would require that the file remain static and unchanged for a possibly significant amount of time. Also, if the file storage location is shared by many computers, each with its own unique file access characteristics, the additional load caused by the computers all re-reading files to compute file hashes can be prohibitive. The file fingerprinting described further below generates hashes of a file from multiple different portions of the file. If the computing resources at the computer device are limited, for example due to a slow network connection or due to other computational requirements at the computer device, not all of the portions of the file need to be hashed as part of the fingerprint. Although a fingerprint with only partial file hashes may not be sufficient to positively identify files as being identical; fingerprints with partial hashes may be sufficient to provide some level of assurance that files are the same.

The interruptible fingerprint process described below can provide various levels of assurance that the content of two files are identical. For example, if the two fingerprints comprise hashes of the complete file contents for both files and both fingerprints match, the file contents are considered identical. If one or more of the fingerprints does not include all of the hashes, the fingerprints may only provide a partial match, and the level of confidence will depend upon the hashed portions that were matched in the fingerprint.

A file fingerprint generated by the interruptible fingerprinting process is a composite hash representation of the state of a file at a particular point in time so that by comparing file fingerprints of one or more files it is possible to determine if the files themselves are identical, or if it is at least likely that they are identical.

The file fingerprinting is interruptible, so that meaningful results can be obtained even if the entire file contents are not hashed as part of the fingerprint. Since the fingerprint process can be interrupted, the fingerprinting process's impact on performance, or a user's perception of performance, can be limited. The interruptible fingerprinting process if completed provides a fingerprint that can be used to determine if two files are identical. If the fingerprinting process is interrupted, for example to reduce processing load on a user's device computing the fingerprint, the resulting partial fingerprint may not be used to determine if two files are identical; however, it can provide an indication of the likelihood of two files being identical. The interruptible fingerprinting process is able to place less of a computing burden on the user's machine than might otherwise be necessary to compute a complete fingerprint while still providing potentially useful information regarding the likelihood two files are the same. Less computational burden allows the fingerprinting process to keep up with file access events in real-time while still providing a computer that is responsive to the user. In addition to interrupting the fingerprinting process to reduce a computational burden on the user's computer, it is also possible to interrupt the fingerprinting process to reduce an I/O burden on a file system, which may be particularly useful for shared file resources.

The fingerprinting process uses hashes of different file portions that are performed in several successive passes and that may be interrupted at any time while still producing a usable fingerprint using the completed hashes. This interruption may be accidental such as due to loss of a network connection over which the file is accessed or it might be deliberate for the purpose of reducing load on a shared file server or the computer computing the hashes or for limiting the time required to compute the complete fingerprint. The file fingerprints are generated from composite hashes of file contents. The hash computation is interruptible, and as such it is important to be able to compare two fingerprints regardless of the number of complete hash passes each fingerprint comprises. The file fingerprint is collision and tamper resistant. Because the hash computation is interruptible, additional steps can be taken to be resistant to collisions and tampering. These additional measures may include striping the file contents for one hash pass so that that the hash is of small stripes taken from across the entire file. Subsequent passes may be taken from non-sequential areas of the file. A pseudo-random, hash-based offset can be incorporated into the blocking structure of the file portions used for hashing in a fingerprint to increase unpredictability and so improving the tamper resistance. Even though the file fingerprint is not intended as a security measure, it is preferable when dealing with an incomplete fingerprint, that the un-hashed portions of the file not be easily exploitable. It is desirable that it not be easy for an attacker to be able to reliably make changes to the file that go undetected. The file fingerprint may also be content adaptive, so that the file size and header of the file are used to assess the file format and select a preferred algorithm, parameters and blocking structure for the hashing that follows.

Broadly, the fingerprint is created by determining a read profile of the file, which is used to guide the generation of the fingerprint, including determining the file portions for hashing for the different passes. Successive hash passes are performed in accordance with the read profile. The passes may be interrupted and as such, only a portion of the hashes in a complete fingerprint may be computed. The hashes may be concatenated into a single composite hash or combined into a file or structure for the fingerprint. The fingerprint may include information on the hash algorithm used, a version ID as well as the total number of passes defined by the read profile.

When generating a fingerprint, the file being fingerprinted is accessed to determine file information such as its length and file type. The file metadata can be used to generate a read profile for the file that specifies the different portions of the file that will be read for use in generating different hashes.

Figure 2:
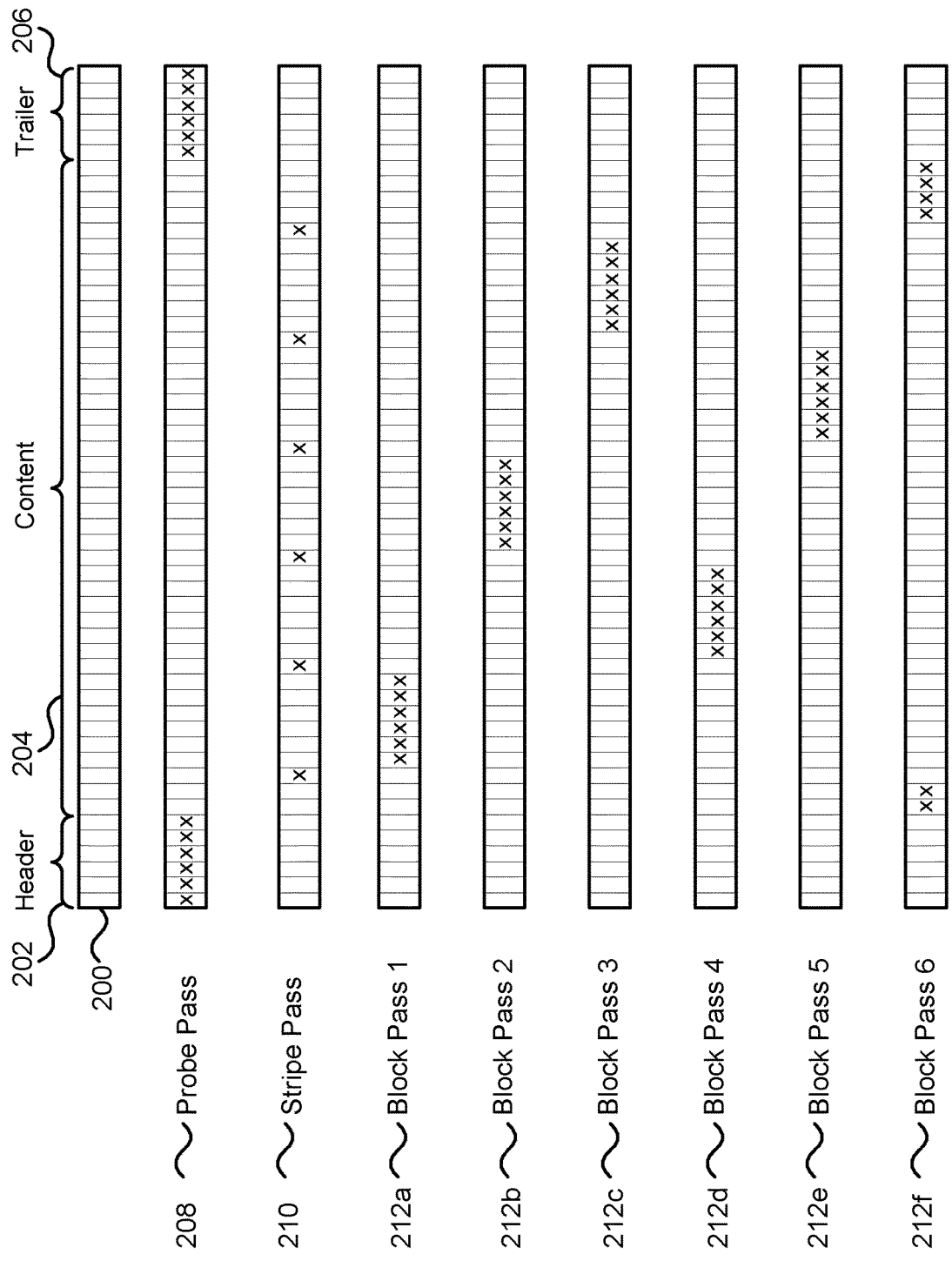
FIG. 2 depicts a file and read profile for different hash passes.

FIG. 2 depicts a file and read profile for different hash passes. As depicted, a file 200 is stored as a number of bytes and may have a header 202, content 204 and a trailer 206. During the file fingerprinting process the file 200, or at least portions of the file, are read. During a first probing pass 208, the file size and header, and possibly the trailer, are read and hashed. The probe pass allows basic analysis of the file content, which can be used to potentially optimize further fingerprint processing. The probe pass also provides a very quick hash of part of the file, so in the event of a transient file, bad connection, etc. that prevents processing of further hashes there is at least a basic file hash. The probe pass can also be used to assess hash throughput to determine the viability of further read passes. After the probe pass 208, a stripe pass 210 is performed which reads small stripes of data spread out across the entire file. The stripe pass 210 may exploit the fact that most data files are structured for locality and tend to group related information together. By quickly reading bands of data from across the file the likelihood of hashing a section that has changed is increased. The specific locations of the stripes may be determined by the block sections in which they are contained. Once the stripe pass is completed, a number of block passes 212a-212f may be performed. Each block pass reads a particular block and hashes the block.

A file can have a number of sections with each section starting at an offset from the start of the file. The file may be split evenly into sections or it may be done non-linearly. A stripe offset can be provided that indicates where the stripe begins relative to the beginning of the section. The stripe offset may be pseudo-random hash-based, which can improve tamper resistance by reducing the predictability of where the stripe portions are read from. The stripe offsets may be the same for each section, or one or more sections may use different stripe offset values. The width of each stripe may be provided as a predetermined value or based on details of the file. For example, a nominal stripe width can be determined by a fixed configuration; however, for large file sizes, the stripe width may be increased to ensure coverage of the entire file. The width of a block may be defined based on different aspects including for example the file size, a maximum number of blocks per file, a minimum number of blocks per file or other characteristics. A block may wrap around the file, as depicted in block pass 212f. Sections, comprising a stripe and block, may be added as a file size increases. If the maximum number of sections is reached, the block and/or stripe size may be increased in order to provide fingerprint coverage of the entire file.

It may not always be possible for the fingerprint processing to cover an entire file. Optimizations can be done to give priority to sections of the file that are likely to have maximum variability. The linearity of the blocking structure may be adjusted to maximize the amount of file coverage that can be achieved when calculation time available is limited for any reason.

It is possible to prioritize file sections for maximizing variability. The ZIP-based family of archive files which include JAR, Office Open XML, OpenDocument ODF, and others provide a simple example of how content-based optimizations can be used. For these files, the archive's directory is located at the end of the file and so the probe phase can be extended to include the file trailer 206 as depicted in FIG. 2 to ensure parts of the file with maximum variability are prioritized.

There may be several orders of magnitude differences in file sizes, and read performance, where read performance is a function of at least raw storage media access performance and inter-connect network performance. Because of this, better file coverage can often be achieved by using fingerprint sections with increasing sizes. Generally, the larger the file, the more it can benefit from increased section non-linearity.

FIG. 3A provides an illustrative file read profile. As depicted in FIG. 3A, the header portion 302a and trailer portion 302b are processed in the probe pass, represented by 'p'. The content portion of the file is broken into sections 304a-304e of increasing size. Each section 304a-304e includes a stripe portion, represented by 's' and a block portion, represented by 'b'. The section lengths can be varied in a pseudo-random hashed based arrangement which increases the tamper resistance of the fingerprinting. FIG. 3B depicts a pseudo random approach in which the section lengths are pseudo random. Each section 314a-314e includes a stripe portion and a block portion.

The hashes of the different portions may be computed independently; however, in order to increase the collision resistance of the composite fingerprint, each hash may continue the hash state of previous hash.

The final file fingerprint representation is variable sized and may have three main parts. The first is a version ID that is used to ensure that incompatible fingerprint methods or parameterizations do not successfully compare. The version ID also allows a client to determine when an unsuccessful comparison is due to incompatibility of the two fingerprints as opposed to due to the fingerprints being of different files. The version ID may be used to allow an "invalid" fingerprint to be explicitly represented. For example if the fingerprint is invalid, the version ID may be set to 'invalid' or another value associated with invalid fingerprints. The fingerprint further includes a nominal number of passes for the file's fingerprint. The nominal number of passes value records the number of passes that the generated read profile would perform if enough time is allowed for the complete fingerprint to be generated. The nominal number of passes value allows a client to determine if a particular fingerprint is a complete or partial fingerprint. Further, the nominal number of passes can also ensure that when comparing fingerprints, two fingerprints that collide only at a lower pass number do not match. For example, if one fingerprint takes 8 passes while another takes 4 and only the first 3 passes of both were completed and are the same, the fingerprints will not match. The fingerprint includes the composite hash that may be a concatenation of each completed pass's hash. The composite hash will include at least the one hash based on the probe pass. Each hash of the composite hash is fixed in size to support comparisons. If the fingerprints include a maximum number of sections, the size of the fingerprint will also have a maximum size.

As an example, a fingerprint may be a variable sized ASCII string comprising a one byte string of ASCII characters 0-9 for the fingerprint Version ID, where 0 means "invalid,"; a one byte string of ASCII characters 1-9 for the nominal number of passes; and one or more concatenated, fixed width, string representations of the completed binary hashes, which may be in base64 or base85. In general, it is desirable to minimize the possible size of a fingerprint.

In determining if two fingerprints match, the version ID's are checked to see if they have the same version ID, the same nominal number of passes, and the completed hashes for each pass in both fingerprints are identical, for example the length of the comparison must be an integer multiple of the fixed width hash length.

The fingerprints described herein allow determinations of similarity probabilities between files to still be drawn even when all of the passes in the read profile were not completed for one or more of the files being compared. In contrast, a single hash of a file only allows a binary determination of two files being identical or different. Further, with single hashes, if a hash is not completed, it is not possible to make any comparison. The fingerprints described herein support a number of conclusions based on the comparison. If two fingerprints, whether they comprise partial or full hashes, are different, then the two files are guaranteed to be different. If partial fingerprints match, that is fingerprints that do not include all of the hashes specified in the nominal number of passes, then the files are at least close and there is a chance that they are the same. This behavior is conservative because possible matches can at least be investigated further. The more passes that match, the greater is the assurance that the files are identical.

Figure 4:
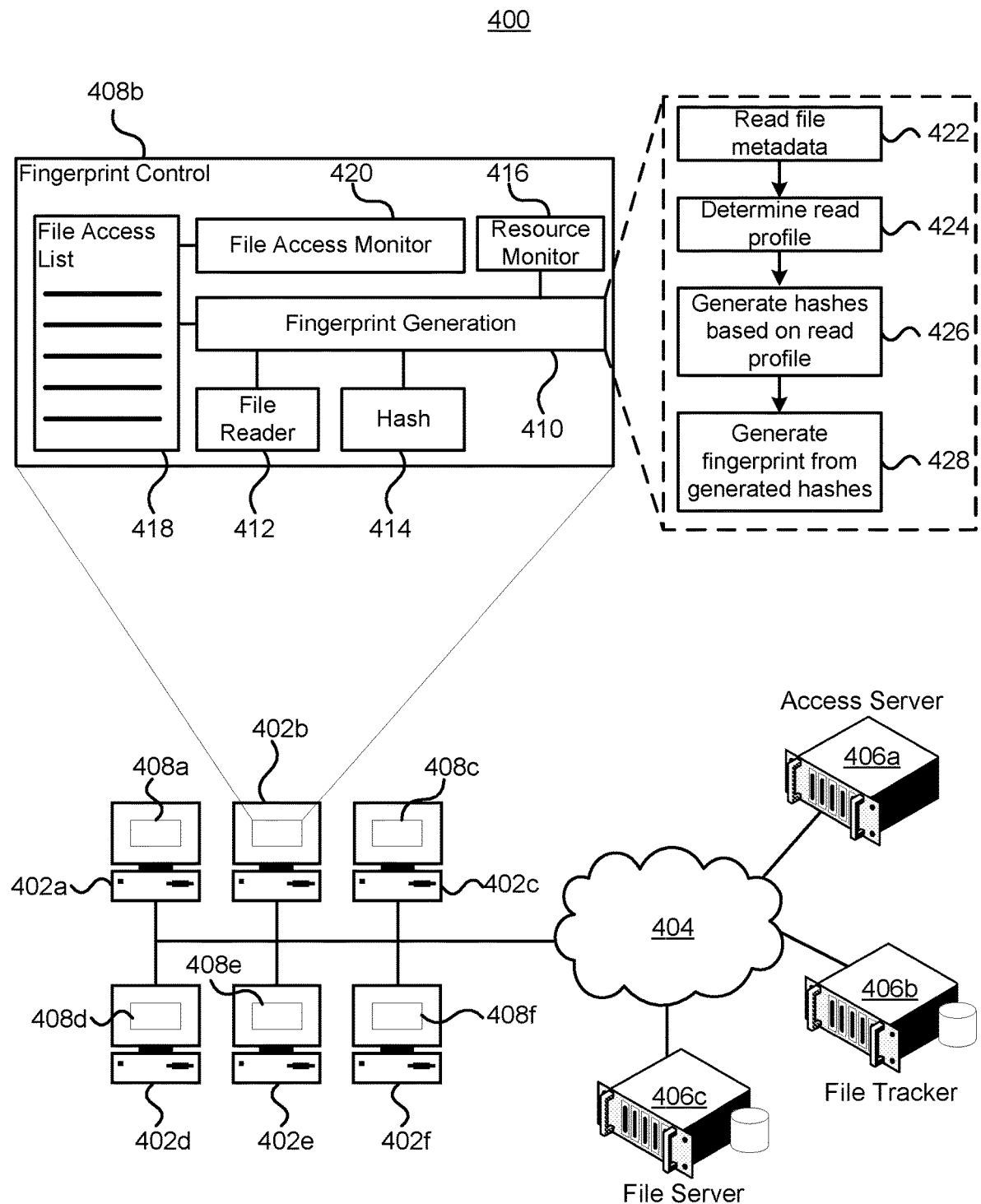
FIG. 4 depicts a system for fingerprinting files accessed by computer devices in a network environment in accordance with the present disclosure.

FIG. 4 depicts a system for fingerprinting files accessed by computer devices in a network environment. The interruptible file fingerprinting system 400 may be incorporated into the file tracking system 100 in order to provide fingerprints of files that are accessed. The file fingerprinting system 400 comprises a number of computer devices 402a-402f (referred to collectively as computers 402) that are communicatively coupled to a network 404. The network 404 is depicted broadly as a single network; however, the network 404 may comprise a plurality of interconnected networks such as a corporation's internal network as well as the internet. A number of computer servers 406a-406c (referred to collectively as servers 406) may be communicatively coupled to the network 404 and accessible to one or more of the computers 402. The servers may provide various functionality such as directory access control functionality, file server functionality, network monitoring and/or control as well as file tracking functionality.

The system 400 may comprise file fingerprinting functionality 408a-408f (referred to collectively as fingerprinting functionality 408) that fingerprints files accessed by the computers 402. Although the fingerprinting functionality 408 is depicted as being implemented on each of the computers 402, it is possible to implement the fingerprinting functionality 408 on other devices such as one or more servers.

Regardless of where the fingerprinting functionality 408 is implemented, it includes fingerprint generation functionality 410 that controls the fingerprinting process. The fingerprint generation functionality 410 may use file reading functionality 412 capable of reading file metadata and portions of a file, as well as hash functionality 414 that can generate hashes. In addition to generating file fingerprints the fingerprinting functionality 408 may also monitor computer resources to determine if the hashing process should be interrupted or stopped, for example due to a slow network connection, a received indication to stop the hashing process or other processing requirements on the computer. The fingerprint generation functionality 410 can generate a fingerprint for a file, and a file list 418 may provide an ordered list of files to fingerprint. The list 418 may be ordered based on a priority of fingerprinting the file, based on the time the file was accessed or other factors. The fingerprint functionality 408 may also include file access monitoring functionality 420 that monitors file access and when a file is accessed, or when the access is completed, the accessed file may be added to the file access list 418.

The fingerprint generation functionality 410 may retrieve a file from the file access list and generate a fingerprint for the file. Generating the fingerprint may include reading file metadata (422), determining a read profile (424) for the file that specifies the different locations within the file to use for the different hash passes. The fingerprint generation functionality may then generate hashes of file portions based on the read profile (426) and then generate the fingerprint from the one or more generated hashes (428).

Figure 5:
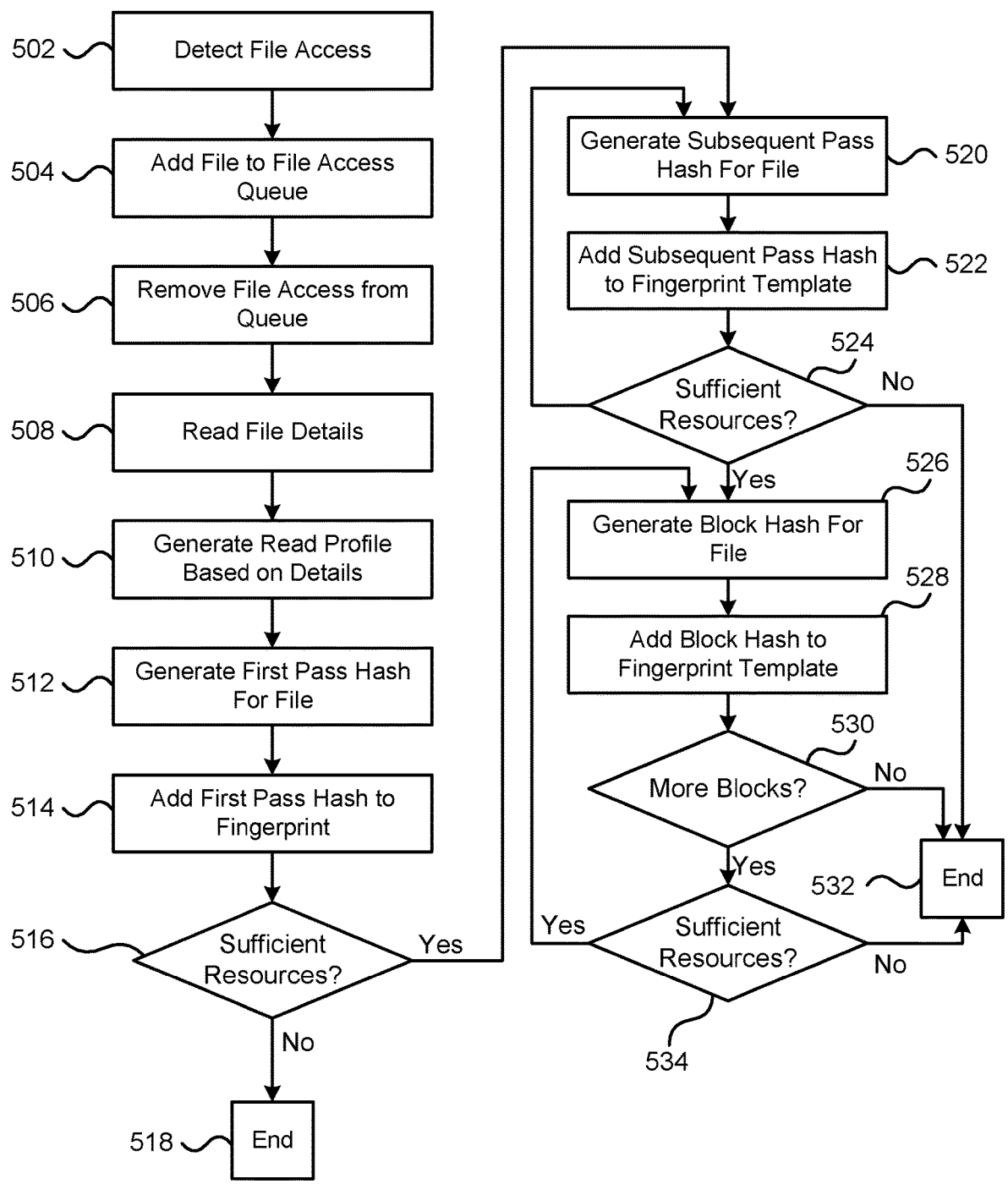
FIG. 5 depicts a method of fingerprinting a file in accordance with the present disclosure.

FIG. 5 depicts a method of fingerprinting a file. The method 500 may be implemented by the fingerprint functionality 408 described above. The method detects file access (502) and adds the accessed file to a file access queue (504). A file is removed from the file access queue (506) and the file details of the file read (508), which can be used to generate the read profile of the file (510). Although described as using a queue to track files to be fingerprinted, it is possible to fingerprint files as they are accessed without using a queue. A fingerprint may be generated including a version ID and the nominal number of passes to be performed for the file. A first pass hashing of the file is performed according to the read profile (512) and the generated hash can be added to the fingerprint (514). The method then determines if there are sufficient computing resources, in terms of for example time taken or estimated time remaining, processing lag, processor load, memory resources, network bandwidth, and/or file I/O (516) to perform further hash passes. If there are not enough resources (No at 516) the fingerprint generation ends (518) and the fingerprint, which will only include the first pass hash, can be returned. If there are enough compute resources to continue the fingerprint generation (Yes at 516), then a subsequent stripe pass hash is generated (520) and added to the fingerprint (522). After generating the subsequent stripe pass hash, it is determined if there are sufficient resources (524) to continue the fingerprinting process. If there are not sufficient resources (No at 524) the fingerprinting process ends (532) and the fingerprint, which includes concatenated hashes from both the first and subsequent stripe passes, may be returned. If there are sufficient resources to continue the fingerprinting process (Yes at 524), a first block hash of the file is generated (526) and added to the fingerprint (528). After generating the block hash, it is determined if there are more blocks (530) to be generated for the fingerprint. If there are no more blocks (No at 530), the fingerprinting process stops (532) and the fingerprint may be returned. If there are more blocks (Yes at 530), it is determined if there are sufficient resources to continue with the fingerprinting process (534) and if there are not sufficient resources (No at 534), the process ends (532). If there are sufficient resources (Yes at 534), another block is hashed.

The above method 500 has described the fingerprinting process as checking whether or not there are sufficient computing resources after generating a hash. Rather than checking whether there are sufficient resources, it is possible to interrupt the process from an external process to terminate the hash process and generate the file fingerprint based upon the hashes completed.

Figure 6:
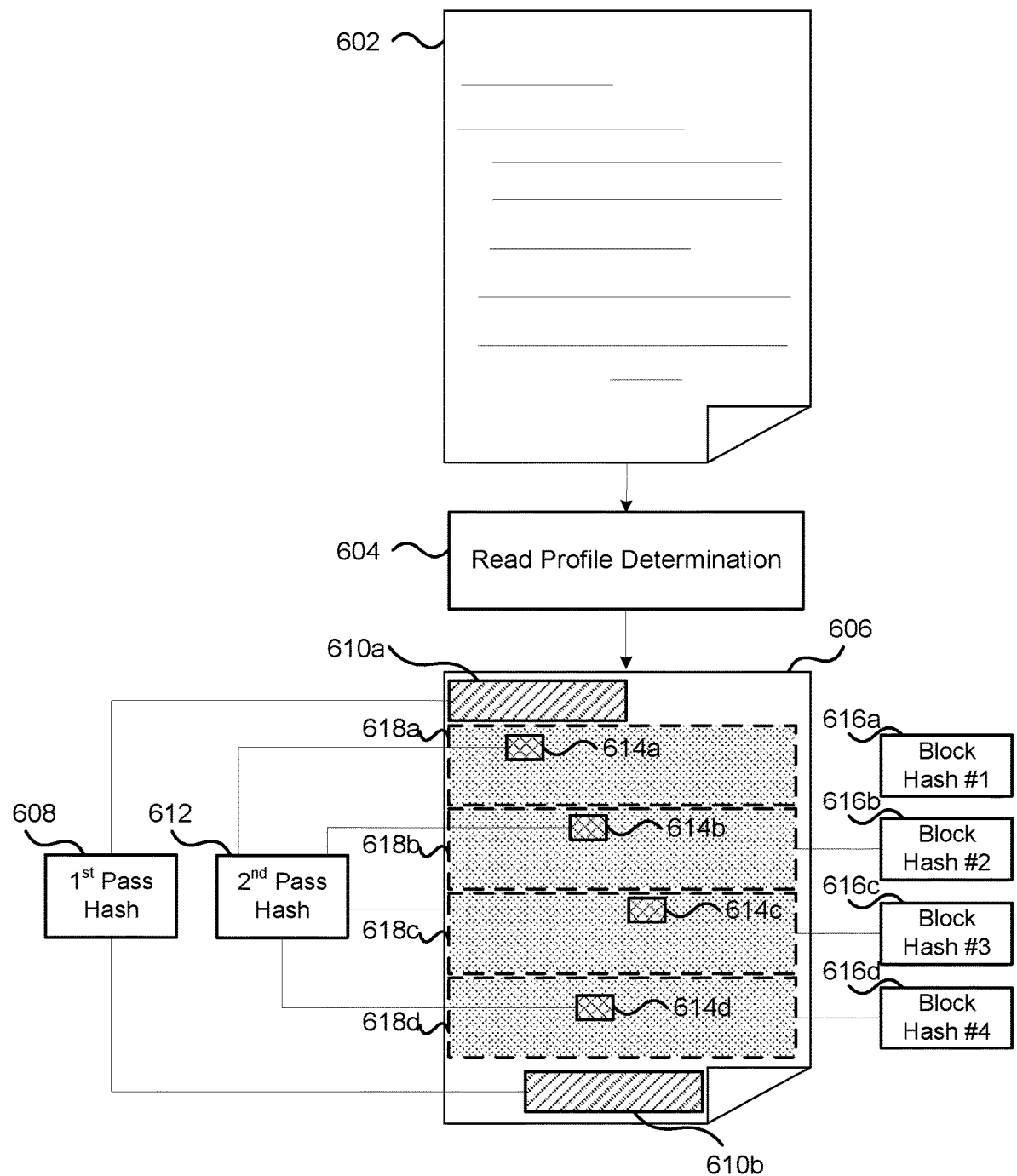
FIG. 6 depicts an illustrative file corresponding hash locations for fingerprinting the file in accordance with the present disclosure.

FIG. 6 depicts an illustrative file and a corresponding hash locations for fingerprinting the file in accordance with the present disclosure. A file 602 can be processed in order to determine the different locations of the file to include in the different hash passes. A read profile determination functionality 604 can process the file metadata, such as the file size and type. The metadata may be read in a first probe pass. As depicted by the file representation 606, the different hash passes may be performed on different locations within the file. For example, the first hash pass 608 may be generated from a header portion 610a of the file, which may also be read to provide the file metadata, as well as a trailer portion 610b. A second hash pass 612 may be formed from a plurality of different striped portions of the file 614a-614d. Each of a number of block hashes 616a-616d may be generated from respective blocks 618a-618d of the file. The generated hashes, whether it is only the first pass hash or all of the hashes, may then be concatenated together into the fingerprint.

FIGS. 7A and 7B depict illustrative fingerprints of a file. The fingerprint 702a shown in FIG. 7A and the fingerprint 702b shown in FIG. 7B are for the same file, with identical content. However, the fingerprint 702a includes all of the hashes while the fingerprint 702b includes only the first 3 hashes. As depicted fingerprint 702a comprises fingerprint metadata 704a that includes version ID, a timestamp of when the fingerprint was generated, or when the file was accessed that caused the fingerprint to be generated. The fingerprint metadata 704a may also include a file ID identifying the file of the fingerprint. Similarly, the fingerprint 702b includes the same metadata 704b although the timestamps differ. As can be seen the first hashes 706a and 706b match each other, the second hashes 708a and 708b match each other and the third hash, or the first block hash, 710a and 710b match. Accordingly, it can be seen that at least a portion of the files are the same. However, since the two last block hashes 714b and 716b of the second fingerprint were not computed they cannot be compared and as such it cannot be guaranteed that the fingerprints are from identical files, although given the matching hashes it is likely the files are identical.

As described above, if the interruptible file fingerprinting process calculates the complete fingerprint, it is possible to identify identical file contents. For example, if two fingerprints that were fully calculated are identical, the files themselves are also identical. However if the fingerprints were interrupted during the fingerprinting process, it may only be possible to provide a level of confidence that the files are the same. The level of confidence will depend upon how much of the fingerprint was completed before it was interrupted. Regardless of if the content identifier is a single hash, or a fingerprint of one or more hashes or some other identifier, it can provide an indication of which files are the same.

Returning to FIG. 1 the central storage server 106 may store the file access information in a database 130 or other storage structure. The storage may use commercially available solutions such as Elastic Search or other solutions. The database 130 associates the content identifier 132 with the access metadata 134. As depicted, a number of records 136a, 136b, 136c 136d received from different hosts can be stored and the content identifier can be used to identify file access activity related to the same file. For example, records 136a and 136d have the same content identifier and as such are related to the same file. Using the file access metadata stored in association with each content identifier, it is possible to track the file movement. As depicted in FIG. 1, and in particular database records 136a and 136d, a file was copied from one host to another, namely the file was read by Host A at 10:00 and then it was written by Host C at 10:05. This file activity may be normal activity or it may be abnormal activity. The file tracking information can be used to monitor file activity and identify abnormal file activity.

The file tracking information may be used in forensic auditing to track a file's movement through a network. This could be advantageous for example for identifying computer devices that accessed a virus-infected file. The tracking may also be useful in auditing data accessed by an individual, which may identify if the individual is involved in data theft. Further, the file tracking may be used to generate alerts based on the file access activity. For example, file identifiers of sensitive files may be flagged so that certain access activities such as, for example, writing to removable storage, causes a notification to be sent to security personnel.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the system and method described herein may be provided by various combinations of software, firmware and/or hardware, other than the specific implementations described herein as illustrative examples.

What is claimed is:

1. A method for use in tracking file movement in a network environment, the method comprising:
   at a host computing device on the network, detecting that a file has been accessed;
   at the host computing device, cause a unique content identifier for the file to be generated from at least a portion of the file;
   transmitting to centralized storage the generated content identifier and file access activity of accessing the file; and
   generating at the centralized storage a notification that the file associated with the generated content identifier and the file access activity has been improperly accessed,
   wherein the unique content identifier comprises a file fingerprint including one or more hashes generated according to a read profile for the file, the read profile comprising a nominal number of probe, stripe and block hash passes for fingerprinting the at least a portion of the file.

2. The method of claim 1, wherein causing the unique content identifier to be generated comprises adding the file to a list of files to be fingerprinted.

3. The method of claim 1, wherein the file access activity comprises information that may be useful in a forensic analysis of file access for the file.

4. The method of claim 1, wherein the file access activity comprises one or more of: a time the file was accessed; a user that accessed the file; a location the file was accessed from; an application used in accessing the file; and a computer host used to access the file.

5. The method of claim 1, further comprising: receiving at the centralized storage the transmitted content identifier and file access activity of accessing the file; and storing at the centralized storage the received content identifier in association with the received file access activity.

6. The method of claim 5, wherein the centralized storage receives and stores a plurality of content identifiers and associated file access activity.

7. The method of claim 1, wherein the nominal number of hash probe, stripe and block passes are provided for fingerprinting the entire file.

8. A device for use in tracking file movement in a network environment, the device comprising:
   a processor capable of executing instructions; and
   a memory storing instructions, which when executed by the processor configure the device to:
   detect that a file has been accessed;
   cause a unique content identifier for the file to be generated from at least a portion of the file;
   transmit to centralized storage the generated content identifier and file access activity of accessing the file; and
   generate at the centralized storage, a notification that the file associated with the generated content identifier and the file access activity has been improperly accessed,
   wherein the unique content identifier comprises a file fingerprint including one or more hashes generated according to a read profile for the file, the read profile comprising a nominal number of probe, stripe and block hash passes for fingerprinting the at least a portion of the file.

9. The device of claim 8, wherein causing the unique content identifier to be generated comprises adding the file to a list of files to be fingerprinted.

10. The device of claim 8, wherein the file access activity comprises information that may be useful in a forensic analysis of file access for the file.

11. The device of claim 8, wherein the file access activity comprises one or more of: a time the file was accessed; a user that accessed the file; a location the file was accessed from; an application used in accessing the file; and a computer host used to access the file.

12. The device of claim 8, wherein the centralized storage receives and stores a plurality of content identifiers and associated file access activity.

13. The device of claim 8, wherein the nominal number of hash probe, stripe and block passes are provided for fingerprinting the entire file.

14. A system for tracking file movement in a network environment, the system comprising:
   a plurality of devices, each device comprising:
      a processor capable of executing instructions; and
      a memory storing instructions, which when executed by the processor configure the device to:
      detect that a file has been accessed;
      cause a unique content identifier for the file to be generated from at least a portion of the file; and
      transmit to centralized storage the generated content identifier and access activity of accessing the file;
   the centralized storage comprising:
      a processor capable of executing instructions; and
      a memory storing instructions, which when executed by the processor configure the centralized storage to:
      receive the transmitted content identifier and the file access activity of accessing the file;
      store the received content identifier in association with the received file access activity; and
      generate a notification that the file associated with the generated content identifier and file access activity has been improperly accessed,
      wherein the unique content identifier comprises a file fingerprint including one or more hashes generated according to a read profile for the file, the read profile comprising a nominal number of probe, stripe and block hash passes for fingerprinting the at least a portion of the file.

15. The system of claim 14, wherein the centralized storage receives and stores a plurality of content identifiers and associated file access activity.

16. The system of claim 14, wherein causing the unique content identifier to be generated comprises adding the file to a list of files to be fingerprinted.

17. The system of claim 14, wherein the file access activity comprises information that may be useful in a forensic analysis of file access for the file.

18. The system of claim 14, wherein the file access activity comprises one or more of: a time the file was accessed; a user that accessed the file; a location the file was accessed from; an application used in accessing the file; and a computer host used to access the file.

19. The system of claim 14, wherein the nominal number of hash probe, stripe and block passes are provided for fingerprinting the entire file.

\* \* \* \* \*